United States Patent
Jou et al.

(10) Patent No.: US 7,853,350 B2
(45) Date of Patent: Dec. 14, 2010

(54) APPARATUS FOR DETECTING MANUFACTURING PARAMETERS OF A MACHINE TOOL

(75) Inventors: Shin-Hung Jou, Changhua County (TW); Yung-Feng Nien, Taichung (TW); Jan-Hao Chen, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 695 days.

(21) Appl. No.: 11/878,416

(22) Filed: Jul. 24, 2007

(65) Prior Publication Data

US 2008/0195244 A1    Aug. 14, 2008

(30) Foreign Application Priority Data

Feb. 9, 2007    (TW) .............................. 96104690 A

(51) Int. Cl.
*G06F 19/00*    (2006.01)
*G05B 11/01*    (2006.01)
*G05B 19/18*    (2006.01)
*G05B 19/25*    (2006.01)

(52) U.S. Cl. .................. 700/174; 700/160; 700/175; 700/178; 700/195; 318/560; 318/569; 318/571

(58) Field of Classification Search ................ 700/174, 700/159, 160, 175, 178; 318/560, 569, 571
See application file for complete search history.

(56) References Cited

U.S. PATENT DOCUMENTS

| | | | |
|---|---|---|---|
| 4,100,837 A | 7/1978 | Kohler et al. | |
| 4,505,158 A | 3/1985 | Maples | |
| 4,912,468 A | 3/1990 | Rust | |
| 4,912,856 A | 4/1990 | Ernst et al. | |
| 5,623,857 A * | 4/1997 | Sakuraba | 82/1.11 |
| 5,683,633 A | 11/1997 | Liehr et al. | |
| 6,049,377 A | 4/2000 | Lau et al. | |
| 6,471,451 B2 * | 10/2002 | Kojima et al. | 409/131 |
| 6,539,274 B1 | 3/2003 | Rauth et al. | |
| 6,681,145 B1 | 1/2004 | Greenwood et al. | |
| 6,748,790 B2 | 6/2004 | Abbe et al. | |
| 6,810,360 B2 * | 10/2004 | Fujishima et al. | 702/182 |
| 6,941,669 B2 | 9/2005 | Shivaswamy et al. | |
| 7,350,964 B2 * | 4/2008 | Wellenbrock et al. | 366/261 |
| 2005/0155470 A1 * | 7/2005 | Ricci et al. | 82/1.2 |
| 2006/0155582 A1 * | 7/2006 | Brown | 705/3 |
| 2006/0254764 A1 * | 11/2006 | Zuilekom | 166/66 |

* cited by examiner

*Primary Examiner*—Ramesh B Patel
*Assistant Examiner*—Sivalingam Sivanesan
(74) *Attorney, Agent, or Firm*—Birch, Stewart, Kolasch & Birch, LLP

(57) ABSTRACT

An apparatus for detecting manufacturing parameters of a machine tool is provided, which comprises at least a sensing and transmitting module, and a receiving module. The sensing and transmitting module has a sensor and a wireless transmitting module. The sensor generates a sensing signal with respect to processing parameter of the machine tool. The wireless transmitting module converts the sensing signal into a wireless signal and transmits the wireless signal to the receiving module. Then the wireless signal is decoded and sent to a processing unit for compensating the machine tool. In the present invention, it is not necessary to consider wiring arrangement so that the sensors can be disposed at positions that are close to the mechanism whose operating status could affect the machining process and the compensation, generated according to the foregoing sensing data, for machine tool will be more effective to improve the machining accuracy.

9 Claims, 6 Drawing Sheets

APPARATUS FOR DETECTING MANUFACTURING PARAMETERS OF A MACHINE TOOL

FIELD OF THE INVENTION

The present invention relates to a sensing apparatus and, more particularly, relates to an apparatus for detecting manufacturing parameters of a machine tool, wherein the apparatus combines wireless technology and sensors to get close around the mechanism whose operating status could affect the machining process without any additional wiring arrangement so as to improve the sensing and compensating accuracy.

BACKGROUND OF THE INVENTION

With the blooming of the machine tool industry, the machining accuracy while processing the work piece is improved as well. However, during machining the work piece, the machining accuracy is affected due to the temperature raising occurred in a feed screw driving unit or other driving mechanisms.

For reducing the influence from the temperature during machining, lots of temperature compensating methods such as neural system compensating method, fuzzy control method and linear regression analysis are disclosed to compensate the driving or feeding mechanism of the machine tool or system. In those conventional ways, it is necessary to rely on a temperature sensor combined with a laser positioning device to compensate the machining status according to the temperature variation.

Other way such as U.S. Pat. No. 5,623,857 disclosed a method and apparatus for compensating for thermal distortion for machine tool, which detects a temperature change of a machine mechanism that is influenced by a heat source, calculates a temperature change having substantially the same time constant as a time constant of the thermal distortion of the machine tool by using the temperature change detected, and, finally, corrects a machining error on the basis of a thermal distortion that changes in correspondence with the calculated temperature change.

In the foregoing conventional ways, the sensing location is mainly decided as close as possible to approach the feed screw or the moving mechanism coupled to the feed screw. Each sensing apparatus is connected to a controller or an operating unit through wiring arrangement. Therefore, problems of wiring interference and difficulties for arranging wiring will be occurred. Meanwhile, sensing apparatus with wiring arrangement will also limit the location of installation and even affect the result of sensing, which means that the disposing position of the sensing apparatus is difficult to be installed near the location having maximum parameters variation. In addition, wire abrasion and break are also occurred easily while using the wiring for information transmission and, in some occasions, wiring is difficult to be configured on a rotary mechanism, such as a rotary tool holder.

SUMMARY OF THE INVENTION

The present invention provides an apparatus for detecting manufacturing parameters of a machine tool, which combines wireless technology and sensors to get close around the desired mechanism without any additional wiring arrangement so as to increase the convenience of installation and improve the sensing and compensating accuracy.

In one embodiment, the present invention provides an apparatus for detecting manufacturing parameters of a machine tool comprising: at least a sensing and transmitting module disposed on at least a specific position on the machine tool, the sensing and transmitting module further comprising: a sensor, functioning to sense a processing parameter of the machine tool and generate a sensing signal with respect to the processing parameter; and a wireless transmitting module, coupled to the sensor, being capable of converting the sensing signal into a wireless signal and transmitting the wireless signal; and a receiving module for receiving the wireless signal.

In another embodiment of the present invention, the machine tool further includes a feed screw driving unit, wherein the specific position is around a feed screw of the feed screw driving unit.

In another embodiment of the present invention, the feed screw driving unit further comprises a plurality of bearing bases rotatably support the feed screw and each of which has a cavity disposed thereon. The sensing and transmitting module further includes a supporting base with a protruding part, which is fixed on the bearing base through a manner of embedding the protruding part into the cavity.

In another embodiment of the present invention, the specific position is on a feed nut which is coupled to a feed screw of the feed screw driving unit. The feed nut further includes a cavity and the sensing and transmitting module further includes a supporting base with a protruding part, which is fixed on the feed nut through a manner of embedding the protruding part into the cavity.

In another embodiment, the machine tool further includes a tool holder, wherein the specific position is located on a cutting tool clamped by the tool holder. The cutting tool further includes a cavity opened on lateral side of the cutting tool and the sensing and transmitting module further includes a supporting base with a protruding part, which is capable of being embedded into the cavity, or the cutting tool further includes a cylindrical cavity opened on top side of the cutting tool and the sensing and transmitting module is disposed into the cylindrical cavity.

In another embodiment of the present invention, the wireless transmitting module may be a blue tooth module or a radio frequency transmitting module.

In another embodiment of the present invention, the wireless transmitting module further includes: a circuit board; a converting circuit, disposed on the circuit board, being capable of converting the sensing signal into a voltage signal; a filtering and amplifying circuit, converting the voltage signal into an amplified signal; an encoder, encoding the amplified signal to a encoded signal; and a radio frequency amplifier for amplifying and transmitting the encoded signal.

In another embodiment of the present invention, the sensor is selected from group consisting of a temperature sensor, a vibrating sensor, a stress/strain sensor and a humidity sensor.

In another embodiment of the present invention, the apparatus further comprises a processing unit electrically connected to the receiving module and functioning to operate and process the signal received from the receiving module so as to generate a compensating signal for the machine tool; a controller, receiving the compensating signal and generating a controlling signal according to the compensating signal; and a servo driver, receiving the controlling signal so as to generate a compensating driving action corresponding to the controlling signal.

BRIEF DESCRIPTION OF THE DRAWINGS

The drawings, incorporated into and form a part of the disclosure, illustrate the embodiments and method related to this invention and will assist in explaining the detail of the invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
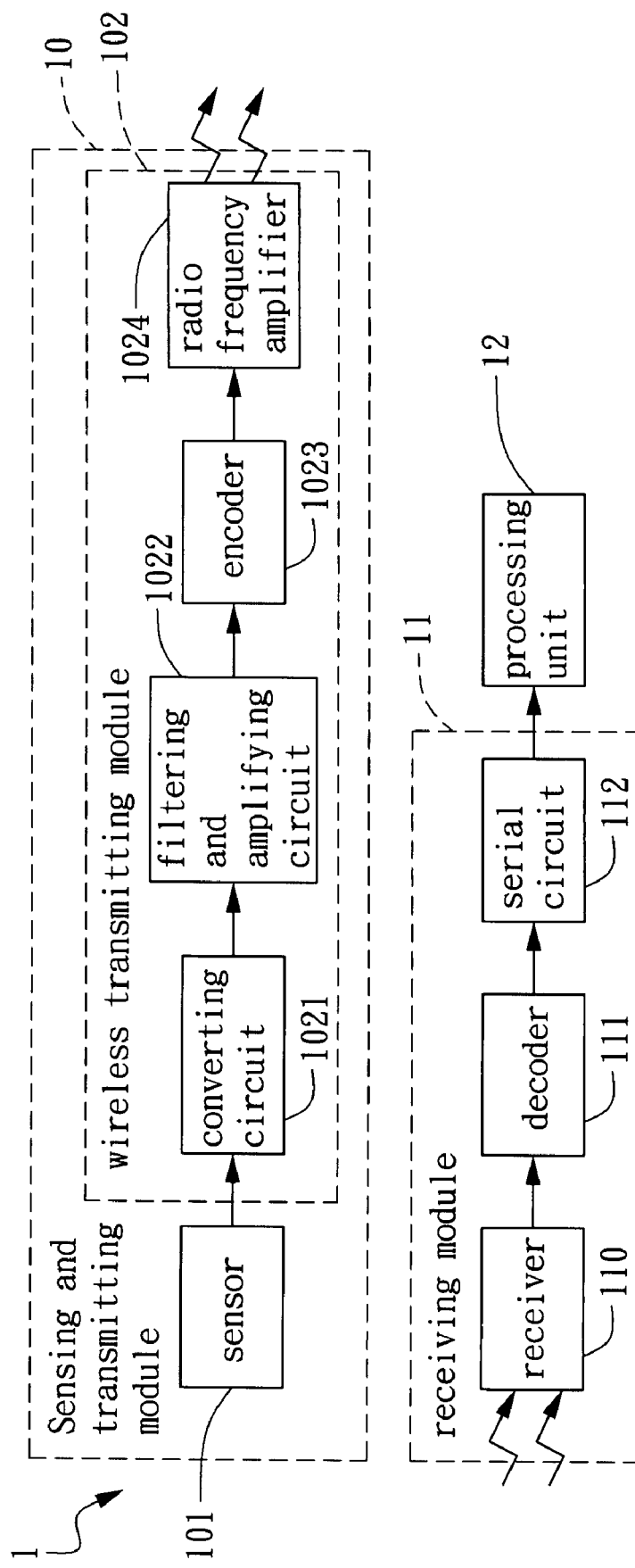
FIG. 1 is a block diagram of an embodiment of an apparatus for detecting manufacturing parameters of a machine tool in the present invention.

Referring to FIG. 1, which is a block diagram of an embodiment of an apparatus for detecting manufacturing parameters of a machine tool in the present invention. The apparatus 1 comprises at least a sensing and transmitting module 10 and a receiving module 11. The parameters in the present invention refer to those which are capable of affecting the machining accuracy of the machine tool. The parameters may include, but not limited to, a vibration of the machine tool, temperature of the cutting tool or driving device, stress or strain of the cutting tool and even the humidity of the environment in which the machine tool is located. The sensing and transmitting module 10 is disposed on at least one specific position. The sensing and transmitting module 10 has a sensor 101 and a wireless transmitting module 102, wherein the sensor 101 functions to sense or measure a processing parameter related to the machine tool so as to generate a sensing signal with respect to the processing parameter. In the embodiment, the sensor 101 may be, but not limited to, a temperature sensor, vibration sensor, stress/strain gauge, or a combination thereof.

The wireless transmitting module 102, electrically connected to the sensor 101, converts the sensing signal into a wireless signal and transmits the wireless signal. The wireless transmitting module 102 maybe a blue tooth module or a radio frequency transmitting module. In the embodiment, the wireless transmitting module 102 is a radio frequency transmitting module, which further includes a converting circuit 1021, a filtering and amplifying circuit 1022, an encoder 1023, and a radio frequency amplifier 1024. The receiving module 11 further has a receiver 110, a decoder 111, and a serial circuit 112.

Figure 2B:
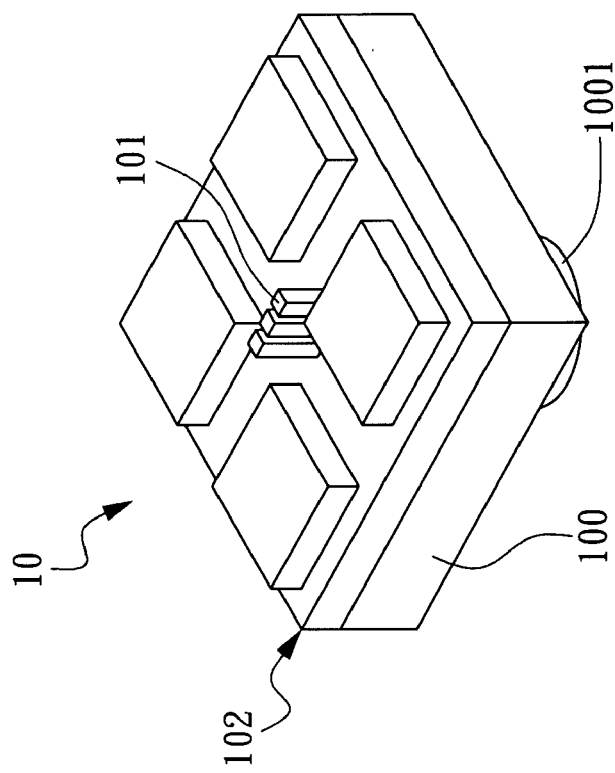
FIG. 2A and FIG. 2B are respectively the explosive and perspective view of the sensing and transmitting module according to the present invention.
Figure 2A:
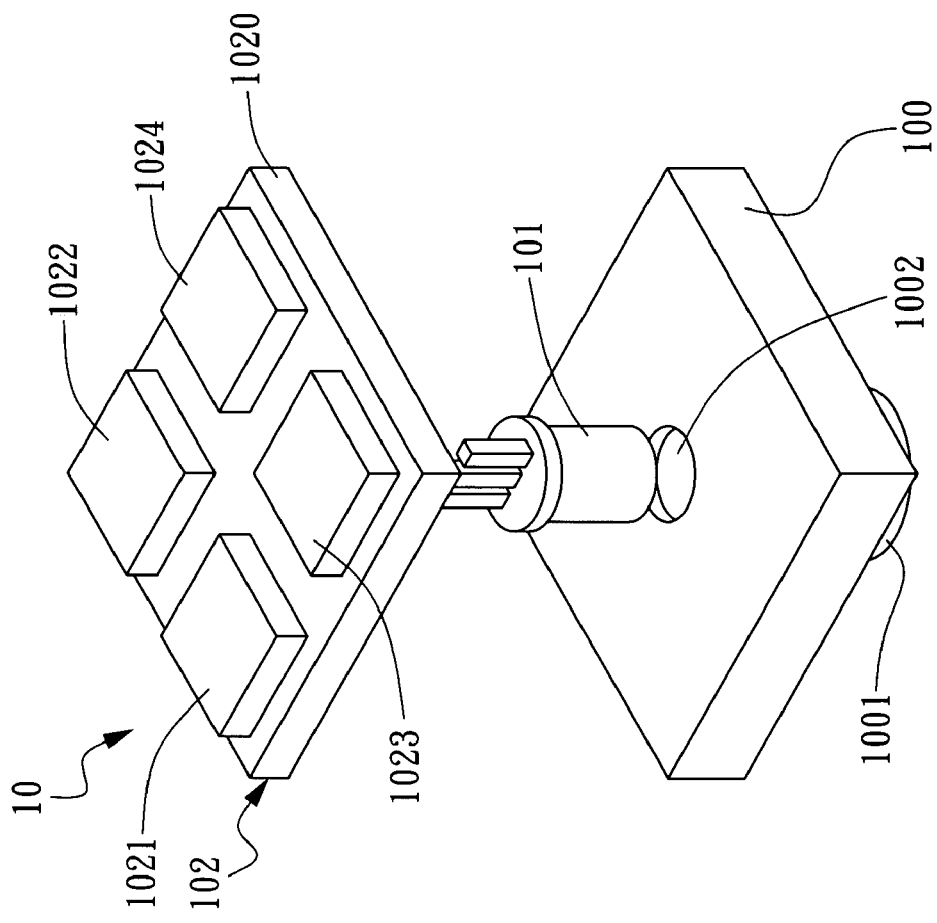

Please refer FIG. 2A and FIG. 2B, which are respectively the explosive and perspective view of the sensing and transmitting module according to the present invention. The sensing and transmitting module 10 has a supporting base 100 with a cavity 1002 opened thereon so as to provide an accommodation space for the sensor 101 and a protruding part 1001. The wireless transmitting module 102 has a circuit board 1020 and the converting circuit 1021, the filtering and amplifying circuit 1022, the encoder 1023, and the radio frequency amplifier 1024 are disposed on the circuit board 1020. The circuit board 1020 is disposed on the supporting base 100 and electrically coupled to the wireless transmitting module 102.

Figure 3:
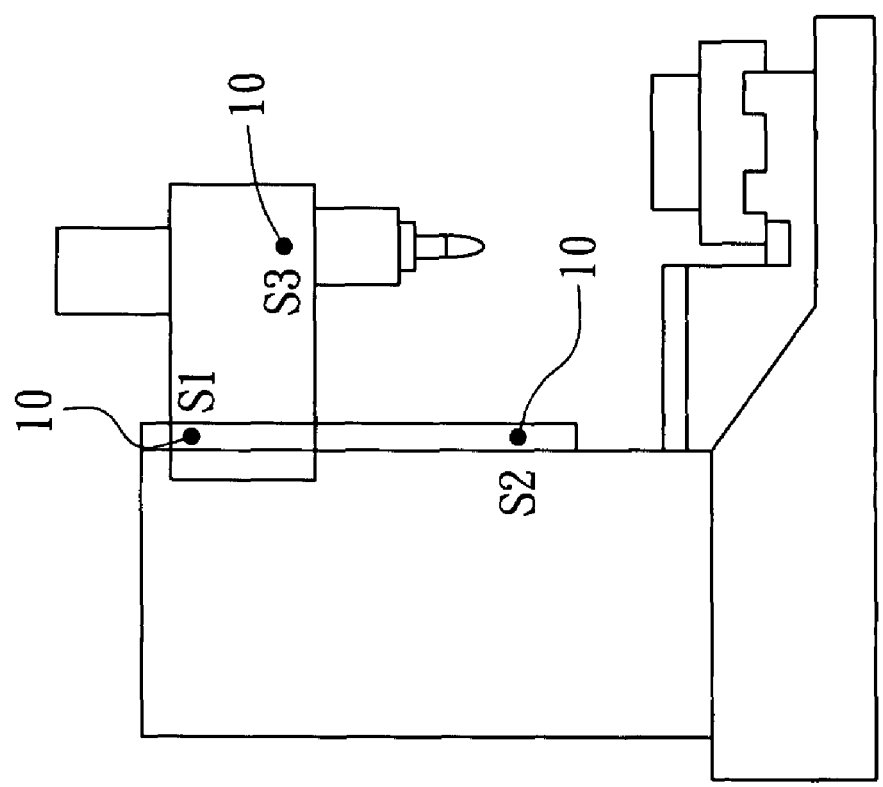
FIG. 3 is a side view of the machine tool which shows the specific positions according to the present invention.

Please refer to FIG. 3, which is a side view of the machine tool. In order to sense and measure the processing parameters of the machine tool 2, the sensing and transmitting modules 102 are disposed on different specific positions on the machine tool 2. The specific position in the present invention is decided according to the requirement for controlling the machining accuracy; it should not be limited to the position shown in FIG. 3. In one example of the specific position, the specific position is decided to be a location for easily detecting the temperature variation of a driving device of the machine tool 2. The driving device in the embodiment is a feed screw driving unit which is disposed on the position S1 and S2 illustrated in the FIG. 3. Meanwhile the position S3 is a position that allows the sensing and transmitting module to detect the processing parameter such as vibration or temperature related to a driving device of a cutting tool clamped by a tool holder.

Figure 4A:
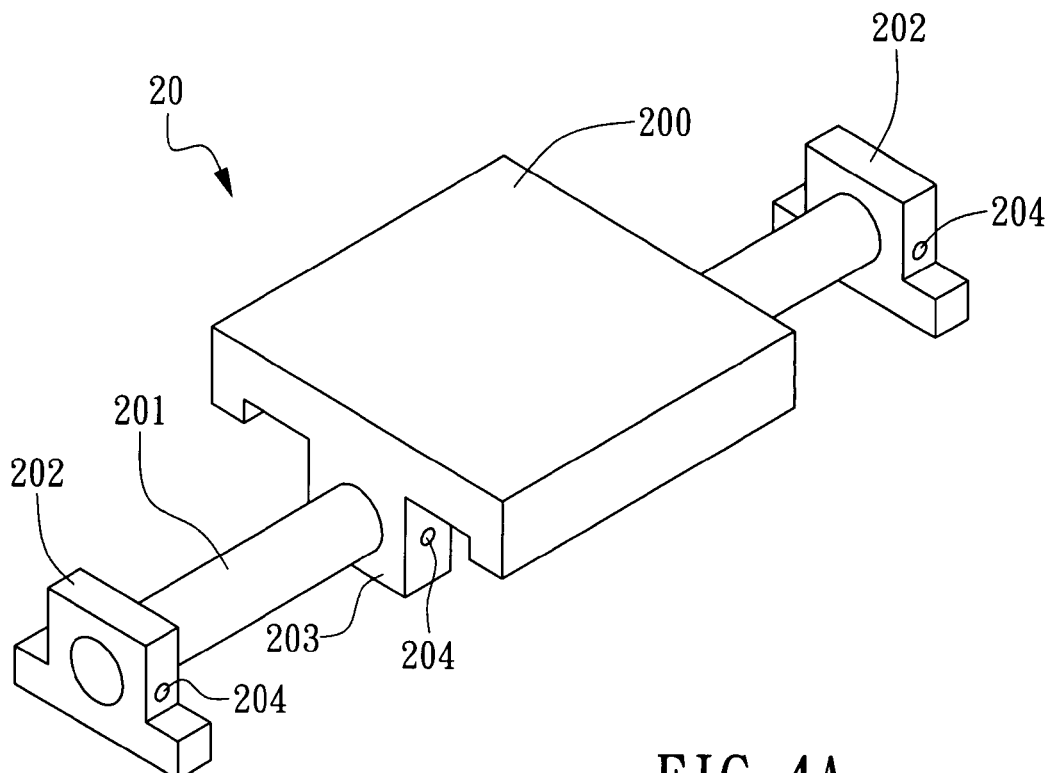
FIG. 4A illustrates a perspective view of the feed screw driving unit in the present invention.

Please refer to FIG. 4A, which illustrates a perspective view of the feed screw driving unit in the present invention. The feed screw driving unit 20 has a feed screw 201, two bearing bases 202, and a working table 200. The working table 200 is coupled to the feed screw 201 by means of a feed nut 203 disposed on the working table 200. The two ends of the feed screw 201 are coupled to the two bearing bases 202 respectively. In order to sense and measure the temperature of the feed screw 201 during machining, the sensing and transmitting modules are disposed on the specific position referring to the feed nut and bearing bases. Since the sensing and transmitting module is wireless, it is capable of being disposed as close as possible to the feed screw 201 so that the temperature of the feed screw 201 during operating is capable of being measured accurately.

Figure 4B:
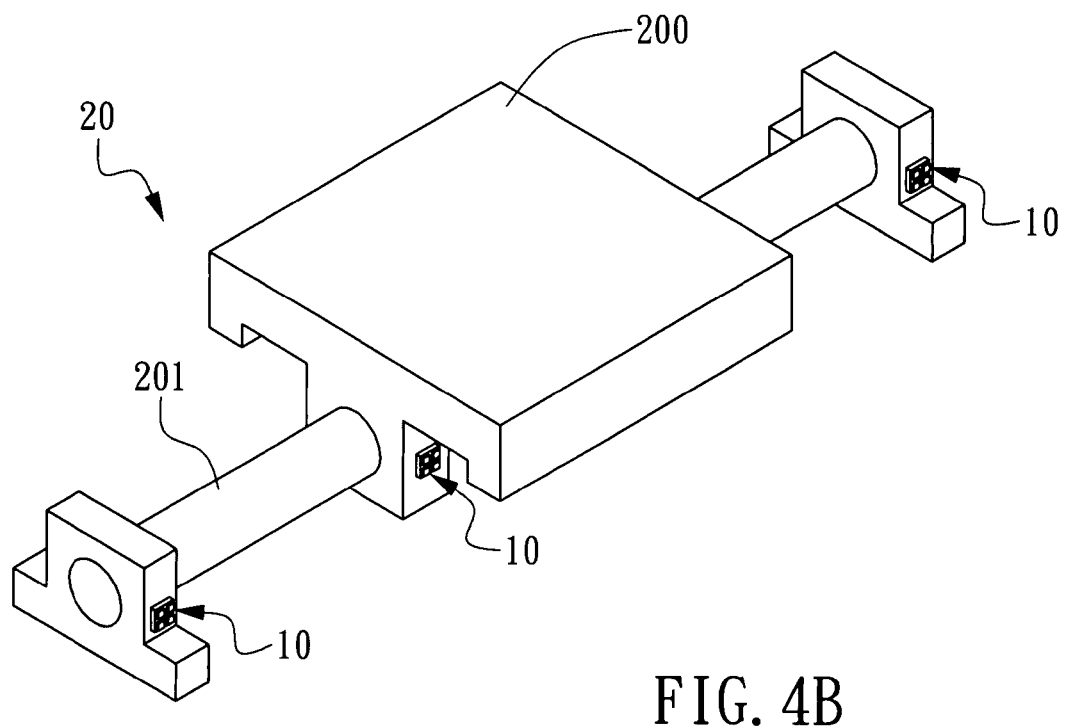
FIG. 4B illustrates the sensing and transmitting modules which are disposed at three specific positions on the feed screw driving unit respectively.

In the embodiment shown in FIG. 4B, the sensing and transmitting modules are disposed at three specific positions respectively, wherein one is at the feed nut 203 while the other two are at the bearing bases 202 respectively. Referring to FIG. 4A and FIG. 4B, in order to sense the processing parameters more accurately, in the embodiment, a cavity 204 is formed on the feed nut 203, and the bearing bases 202. There are many ways to affix the sensing and transmitting module 10 in the cavity 204 such as embedding, fixed by screw or other conventional way which is know by the one skilled in the art. In the embodiment, the supporting base of the sensing and transmitting module 10 is fixed on the feed nut and bearing bases by means of embedding the protruding part 1001 into the cavity 204 disposed on the feed nut and bearing bases so as to affix the sensing and transmitting modules 10 on the specific positions.

Figure 5B:
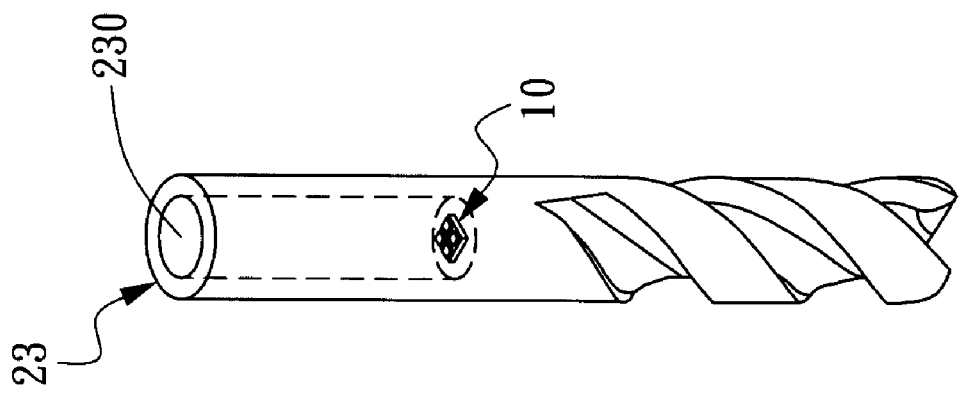
FIG. 5B illustrates another embodiment of combination of the sensing and transmitting module and the cutting tool.
Figure 5A:
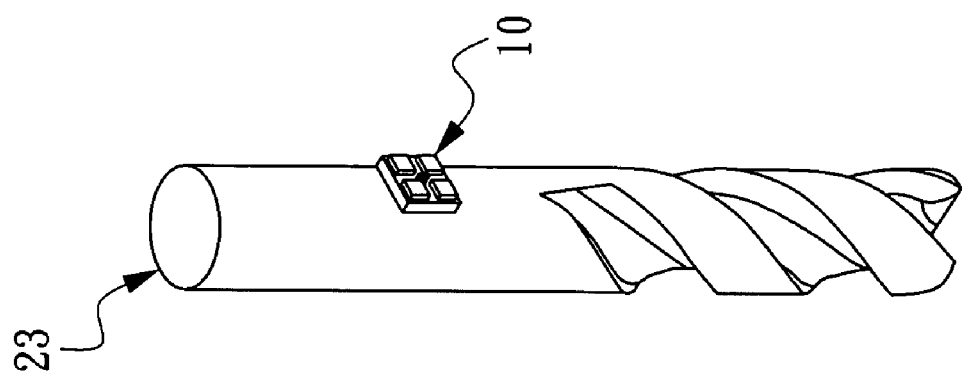
FIG. 5A illustrates an embodiment of the combination of the sensing and transmitting module and the cutting tool.

Please refer to FIG. 5A, which illustrates an embodiment of the combination of the sensing and transmitting module and the cutting tool. In this embodiment, the sensing and transmitting module 10 is utilized to sense and measure the status of the cutting tool 23 so as to judge whether the cutting tool 23 is in normal condition or not. The machine tool has a tool holder which is a rotary tool holder that is capable of clamping the cutting tool 23 which may be, but should not be limited to, a rotary cutting tool.

In the present embodiment, a cavity (not shown) is formed on a lateral side of the clamped part of the cutting tool 23 and the supporting base of the sensing and transmitting module 10 has a protruding part 1001 (shown in FIG. 2A) embedded into the cavity so as to affix the sensing and transmitting module 10 on the cutting tool 23. The sensor of the sensing and transmitting module 10 my be a stress or strain gauge which can generate signal corresponding to the deformation of the cutting tool 23. For example, if the cutting tool 23 is operated under normal condition, the main body of the cutting tool will deform due to the reaction force between the work piece and the cutting tool 23. On the contrary, if the cutting tool 23 is broken during processing, there will not have any deformation or an abnormal deformation will be detected; therefore, it will be capable of judging whether the cutting tool is normal or not according to the deformation measured by the sensor of the sensing and transmitting module 10 disposed on the cutting tool 23.

Please refer to FIG. 5B, which illustrates another embodiment of combination of the sensing and transmitting module and the cutting tool. In addition to the way disclosed in the FIG. 5A, it may form a cylindrical cavity 230 from the top side of the cutting tool 23 for accommodating the sensing and transmitting module 10 disposed therein so as to detect if the cutting tool 23 is in normal condition or not. Although the embodiment takes a milling cutter as an example for explaining, it should not be a limit of cutting tool in the present invention because other cutting tool such as a lathe tool or drilling tool may also be practiced according to the essence of the present invention.

Figure 6:
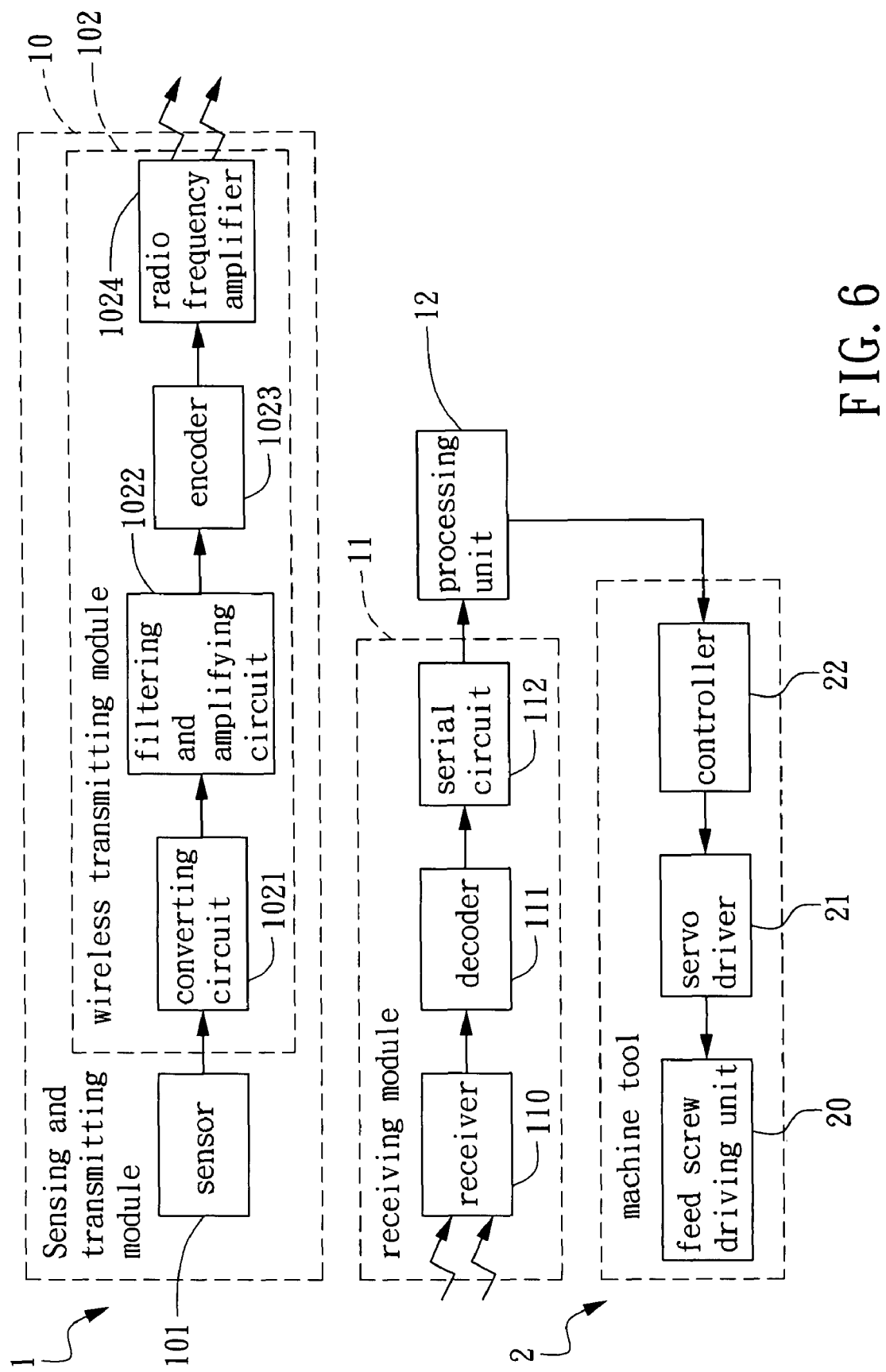
FIG. 6 illustrates a block diagram referring to operating process of the machine tool and the sensing and transmitting module according to the present invention.

Please refer to FIG. 6, which illustrates a block diagram referring to operating process of the machine tool and the sensing and transmitting module according to the present invention. In the embodiment shown in FIG. 6, the temperature of the feed screw of the feed screw driving unit 20, shown in FIG. 4A, is monitored for compensating during machining the work piece. The sensing and transmitting modules 10 are positioned in the three specific positions shown in FIG. 4B.

During machining the work piece, the temperature of the feed screw will getting higher due to the high speed rotation. In this stage, the sensor 101 of the sensing and transmitting module 10 will measure the temperature degree of the feed screw at the three specific positions (the feed nut, and the bearing bases) so as to form a sensing signal. After that, a converting circuit 1021 receives and converts the sensing signal into a voltage signal. A filtering and amplifying circuit 1022 will receive the voltage signal and convert the voltage signal into an amplified signal. Then an encoder 1023 receives the amplified signal and encodes the amplified signal to an encoded signal. After that, the encoded signal is amplified by a radio frequency amplifier 1024 and then is transmitted in radio frequency format.

The transmitted encoded signal is receives by a receiver 110 of the receiving module 11. Then a decoder 111 decodes the received encoded signal to form a decoded signal and transfers the decoded signal to a processing unit 12 through a serial circuit 112. The processing unit 12 may be a device having operating and calculating capability such as a computer, a workstation, or a server. After receiving the decoded signal, the processing unit 12 processes and operates the decoded signal to form a compensating signal according the result of the processing. The compensating signal is transferred to a controller 22 disposed on the machine tool 2. Once the controller 22 receives the compensating signal, the controller 22 will command the servo driver 21 to generate a compensating driving action to drive the feed screw driving unit 20 so as to adjust the position of feed screw and prevent machining precision and accuracy from being affected by temperature arising during machining process. The servo driver 21 in the present embodiment is a driver with capability to drive multiple spindles. By means of the present invention, it is not necessary to consider wiring arrangement so that the sensors are capable of being disposed at positions that are pretty close to the mechanism whose operating status could affect the machining process so that the compensation for machine tool will be more accurate to improve the machining accuracy.

While the embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An apparatus for detecting manufacturing parameters of a machine tool comprising:
   a feed screw driving unit having a feed screw;
   a pair of bearing bases respectively, and rotatably support the end of the feed screw, wherein at least one of the bearing base has a cavity disposed thereon;
   at least a sensing and transmitting module disposed around the feed screw of the feed screw driving unit on the machine tool, the sensing and transmitting module further comprising:
      a supporting base with a protruding part, which is fixed on the bearing base through a manner of embedding the protruding part into the cavity;
      a sensor, disposed on the supporting base and functioning to sense a processing parameter of the machine tool and generate a sensing signal with respect to the processing parameter; and
      a wireless transmitting module, disposed on the supporting base and electrically connected to the sensor, being capable of converting the sensing signal into a wireless signal and transmitting the wireless signal; and
   a receiving module for receiving the wireless signal.

2. The apparatus according to the claim 1, wherein the wireless transmitting module is a blue tooth module.

3. The apparatus according to the claim 1, wherein the wireless transmitting module is a radio frequency transmitting module.

4. The apparatus according to the claim 3, wherein the wireless transmitting module further includes:
   a circuit board;
   a converting circuit, disposed on the circuit board, being capable of converting the sensing signal into a voltage signal;
   a filtering and amplifying circuit, converting the voltage signal into an amplified signal;
   an encoder, encoding the amplified signal to a encoded signal; and
   a radio frequency amplifier for amplifying and transmitting the encoded signal.

5. The apparatus according to the claim 1, wherein the sensor is selected from group consisting of a temperature sensor, a vibrating sensor, a stress/strain sensor and a humidity sensor.

6. The apparatus according to the claim 1, further comprising a processing unit electrically connected to the receiving module and functioning to operate and process the signal received from the receiving module so as to generate a compensating signal for the machine tool.

7. The apparatus according to the claim 6, further comprising:
- a controller, receiving the compensating signal and generating a controlling signal according to the compensating signal; and
- a servo driver, receiving the controlling signal so as to generate a compensating driving action corresponding to the controlling signal.

8. The apparatus according to the claim 7, the servo driver is a servo motor with capability to drive multiple spindles.

9. An apparatus for detecting manufacturing parameters of a machine tool comprising:
- a feed screw driving unit having a feed screw;
- a feed nut coupled to the feed screw, wherein the feed nut further includes a cavity;
- at least a sensing and transmitting module disposed on the feed nut on the machine tool, the sensing and transmitting module further comprising:
  - a supporting base with a protruding part, which is fixed on the bearing base through a manner of embedding the protruding part into the cavity;
  - a sensor, disposed on the supporting base and functioning to sense a processing parameter of the machine tool and generate a sensing signal with respect to the processing parameter; and
  - a wireless transmitting module, disposed on the supporting base and electrically connected to the sensor, being capable of converting the sensing signal into a wireless signal and transmitting the wireless signal; and
- a receiving module for receiving the wireless signal.

* * * * *